United States Patent
Honjo

(10) Patent No.: US 7,675,650 B2
(45) Date of Patent: Mar. 9, 2010

(54) FLORAL PRINT PROCESS

(76) Inventor: Osamu Honjo, 3456 Roselawn Ave., Glendale, CA (US) 91208

(*) Notice: Subject to any disclaimer, the term of this patent is extended or adjusted under 35 U.S.C. 154(b) by 290 days.

(21) Appl. No.: 11/520,155

(22) Filed: Sep. 13, 2006

(65) Prior Publication Data

US 2008/0062439 A1    Mar. 13, 2008

(51) Int. Cl.
*G06K 15/00* (2006.01)
*H04N 1/60* (2006.01)
*A01N 3/00* (2006.01)
*B41C 1/06* (2006.01)
*B41D 7/00* (2006.01)

(52) U.S. Cl. .................... 358/2.1; 358/1.18; 358/1.9; 428/24; 101/33; 101/34

(58) Field of Classification Search ............. 428/15–27, 428/32.1–32.38
See application file for complete search history.

(56) References Cited

U.S. PATENT DOCUMENTS 4,957,787 A * 9/1990 Reinhardt et al. ............. 428/24
5,473,736 A * 12/1995 Young ........................ 345/593
5,898,508 A * 4/1999 Bekanich .................... 358/474
2006/0203288 A1* 9/2006 Liccini et al. .............. 358/1.18

OTHER PUBLICATIONS

Bonny Lhotka, Dorothy Simpson Krause, Karin Schminke Fine Art and the Flatbed Printer Digital Graphics, Sep. 2005 Issue, pp. 16-22.*
Adobe Phototshop (R) 7.0 Lisa A. Bucki 2002 Premier Press.*
Scanning Leaves—A creative scanner guide Peter Bargh Jan. 5, 2002.*

* cited by examiner

*Primary Examiner*—Twyler L Haskins
*Assistant Examiner*—Barbara D Reinier
(74) *Attorney, Agent, or Firm*—Robert Nick

(57) ABSTRACT

A method of creating an ornamental representation of a natural flower or foliage, by digitally scanning one or more surfaces of one or more pieces of a natural flower or foliage and directly printing the scanned images on respective one or more surfaces of a medium. The printed pieces are then cut out of the medium, shaped to create the contour of a natural petal or foliage and composited to create an ornamental representation of the natural flower or foliage.

10 Claims, 3 Drawing Sheets

FLORAL PRINT PROCESS

FIELD OF THE INVENTION

The invention relates to a unique process for manufacturing ornamental representations of natural leaves, flowers and branches.

BACKGROUND OF THE INVENTION

Artificial foliage is traditionally manufactured using a silkscreen or heat transfer process to transfer a two-dimensional image of a flower petal or leaf onto a medium such as fabric, paper or other material. The image may be drawn by hand or can be produced in a digital image format.

To create the foliage, the same image is transferred to multiple locations on the medium and the silkscreen process may be repeated several times to add different colors at each location.

The transferred images are then cut out of the medium and are often hand-painted with accent colors and lines.

In order to impart a realistic shape to foliage, such as a petal or leaf, the cut images are placed in a mold and heated to form a three-dimensional contour.

The process continues with the addition of plastic veins or support wires to the back of the petal or leaf and the resultant parts are combined to form a flower or foliage.

A variety of coatings may also be added to the flower or foliage to create a natural texture, provide fragrance and preserve the final product.

The use of a silkscreen or heat transfer process to create a realistic representation of natural foliage has a number of limitations.

In a silkscreen process, the image of the top surface of a leaf, for example, is transferred to the top surface of a material. When the transferred image is cut out of the material, the top and bottom surfaces of the leaf are essentially identical in composition. The top and bottom surfaces of a natural leaf, however, do not have the same composition.

In addition, colors applied to the top surface of the material during the silkscreen process tend to bleed through to the bottom surface of the material, creating a bottom surface color that is not representative of the bottom surface color of a natural leaf. Further, the multiple templates used for different colors in a silkscreen process may be misaligned and tend to produce unrealistic variations in color density in the material.

In a typical heat transfer process, a four-color image of the top surface of a leaf is initially transferred to a heat-sensitive film that is subsequently placed on the top surface of a material and heated to transfer the image to the material. A bottom surface image of the leaf may be similarly transferred to another location on the top surface of the material. The top surface and bottom surface image pieces are then cut out of the material and pasted together. As such, it takes two layers of material to create a leaf or petal resulting in an unrealistic representation of a natural leaf.

Accordingly, it is very difficult to represent a natural leaf or flower petal in both composition and color using traditional silkscreen or heat transfer methods.

The process of the present invention substantially departs from traditional methods used to manufacture artificial flowers and provides a unique direct print process to create a realistic representation of a natural flower or foliage on a medium.

BRIEF SUMMARY OF THE INVENTION

It is an object of the invention to produce a realistic representation of a natural flower or foliage on a medium such as fabric, paper, or other material by digitally scanning one or more surfaces of a natural leaf, flower, or branch, and directly printing the scanned digital images on a medium.

It is another object of the invention to produce a realistic representation of a natural flower or foliage on a medium such as fabric, paper, or other material by digitally scanning the top and bottom surfaces of a natural leaf, flower, or branch and directly printing the respective digital images on the top and bottom surfaces of the medium.

It is another object of the invention to produce a realistic representation of a natural flower or foliage by directly printing scanned digital images of one or more surfaces of one or more pieces of the natural flower or foliage on a medium, cutting and forming the printed pieces to provide a natural contour and compositing the pieces into a flower or foliage.

It is another object of the invention to produce a realistic representation of a natural flower or foliage by directly printing scanned digital images of the top and bottom surfaces of one or more pieces of the natural flower or foliage on respective top and bottom surfaces of a medium, cutting and forming the printed pieces to provide a natural contour and compositing the pieces into a flower or foliage.

It is another object of the invention to produce a realistic representation of a natural object on a medium such as fabric, paper, or other material by digitally scanning one or more surfaces of the object and directly printing the scanned digital images on a medium.

These and other objects of the invention will become apparent from the detailed description and accompanying drawings herein.

DETAILED DESCRIPTION OF THE INVENTION

Figure 1:
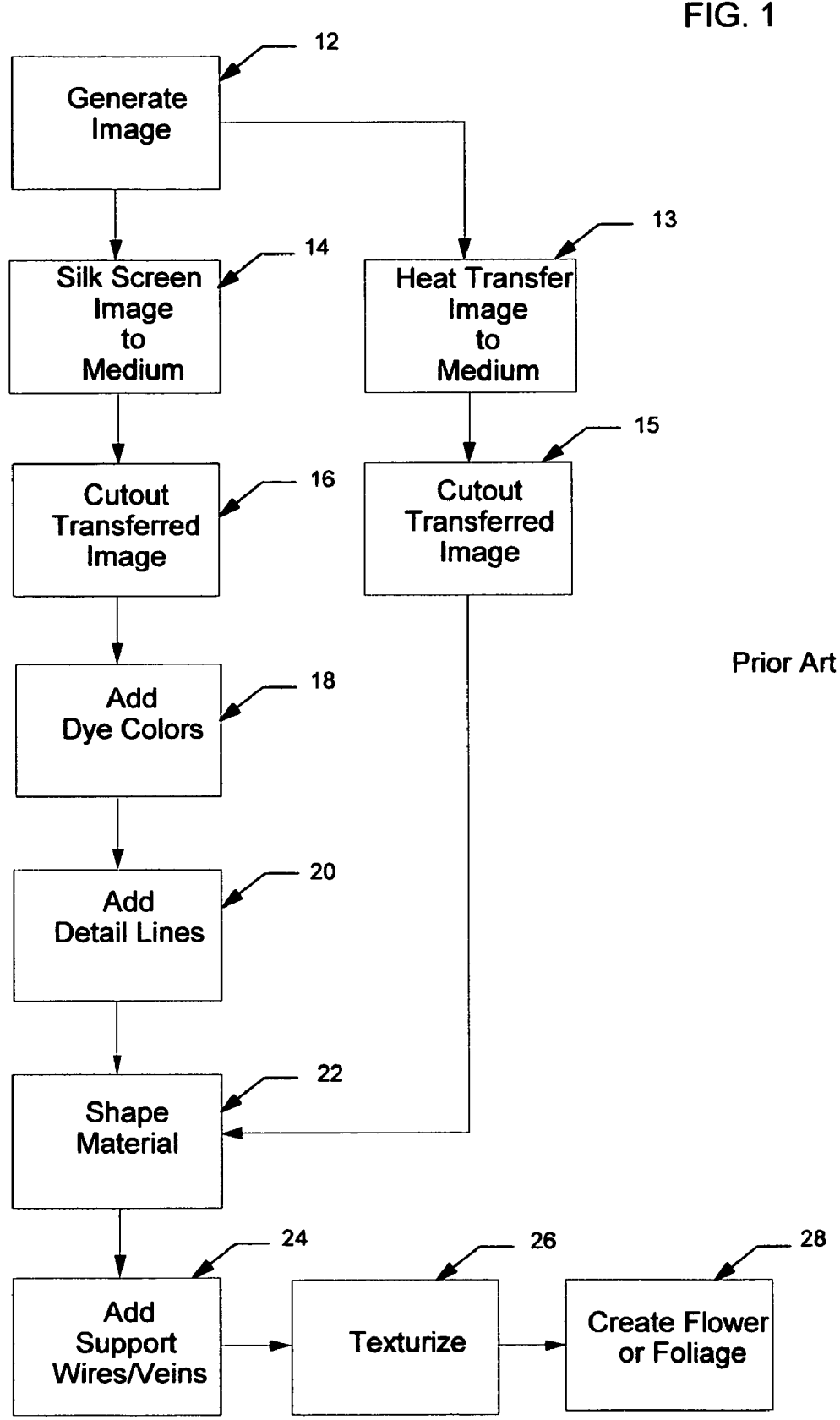
FIG. 1 is a flow chart of a prior art process for making artificial foliage.

With reference to FIG. 1, a prior art process for making an artificial flower or foliage begins by first generating an image of a flower petal or foliage as shown in step 12. Such an image may be drawn by hand on paper or other material or can be created using a computer drawing program.

The created image is then transferred to a medium such as fabric, paper or other material using a well known silkscreen or heat transfer process as shown in step 13 or step 14.

In practice, the silkscreen process may be repeated several times to provide different colors at selected locations on the transferred image and the same image can be used multiple times to create a flower or foliage.

The silk screened image or heat transfer image is then cut out of the medium as shown in step 15 or step 16.

For the heat transfer image, the cut image is then placed in a mold to heat press the material to impart a realistic three-dimensional shape to a petal or leaf, as shown in step 22.

For the silk screened image, one or more dye colors are added to the cut image as shown in step 18 and detail lines are painted on selected parts of the image as shown in step 20 before heat pressing the material, as shown in step 22.

Support wires and/or plastic veins are added as shown in step 24 and a texturizing coating is applied, as shown in step 26, to make each petal or leaf more realistic. The resultant pieces are then composited to create a flower or foliage as shown in step 28.

Figure 2:
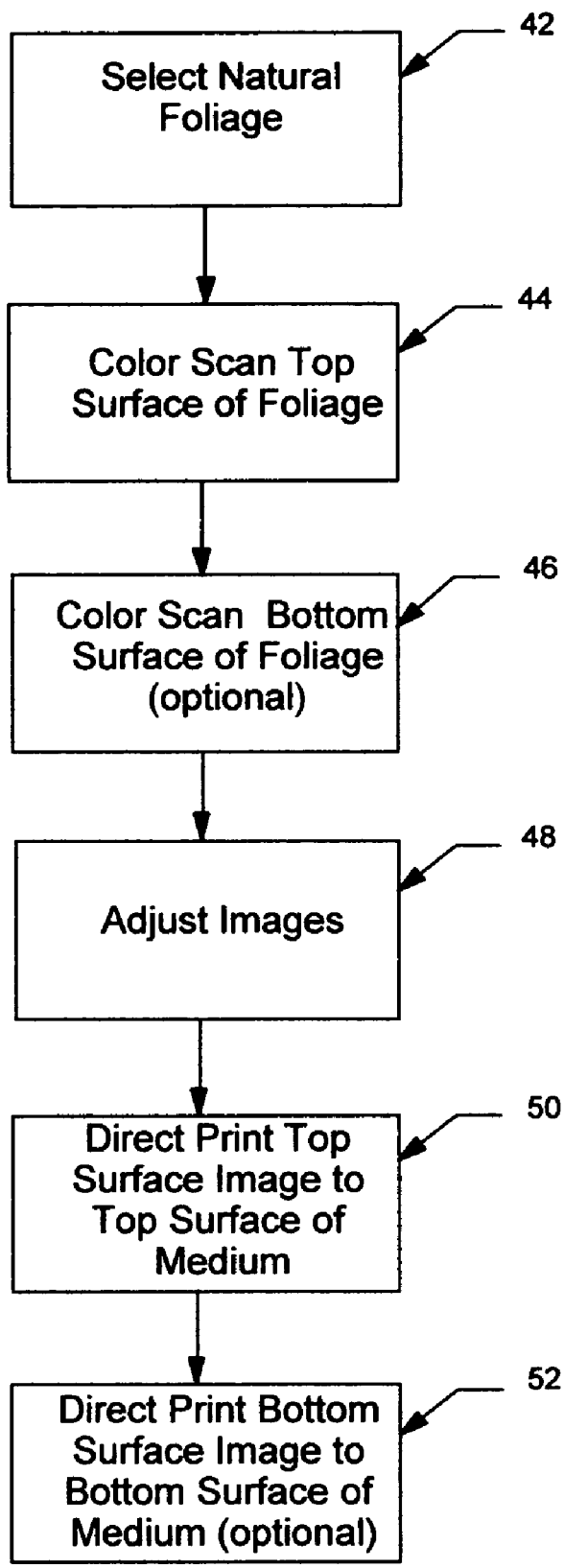
FIG. 2 is a flow chart of the floral print process of the invention.

With reference to FIG. 2, a preferred process of the invention for creating a realistic representation of natural foliage on a medium begins by selecting natural foliage as shown in step 42 and digitally scanning one or more surfaces of one or more pieces of the foliage using a color scanner, well known in the art, as shown in steps 44 and 46.

The top and bottom surfaces of a natural leaf or flower petal are not identical and, in order to provide a more realistic representation of natural foliage, an important feature of a process of the invention is to provide separate image scans of the top surface and bottom surface of the foliage.

The scanning process of the invention provides a more accurate color density than is possible with a conventional silkscreen process that uses multiple screens. Further, colors applied to the top surface of a material during a silkscreen process tend to bleed through to the bottom surface of the material creating a bottom surface color that is not representative of the bottom surface color of a natural leaf. The process of the invention produces realistic surface colors by providing separate top surface and bottom surface color scans.

The process continues in step 48 where the top surface and bottom surface image scans of each piece of the foliage are adjusted, using well-known image manipulation computer software programs, to permit accurate registration of the respective images on the top and bottom surfaces of a medium and to modify the size, shape, color balance, tone and orientation of the images. As such, the process of the invention provides the capability to make each flower or petal unique. In a conventional silkscreen or heat transfer process, each flower or petal is identical.

The images are then transferred to a medium, made of organic or non-organic material such as natural fabric, synthetic fabric, paper, plastic, wood, metal, ceramic, glass and the like, by directly printing the top surface and bottom surface images on respective top and bottom surfaces of the medium, as shown in steps 50 and 52 using image printing apparatus, such as a flat-bed digital printer.

As shown in FIG. 2, the top and bottom surfaces of foliage are scanned and printed but it is understood that only one surface of the foliage, such as the top surface, may be used without detracting from the spirit of the invention.

While the process of the invention is useful to create a realistic representation of natural foliage on a medium, the process may also be used to create a realistic representation of other natural objects.

Figure 3:
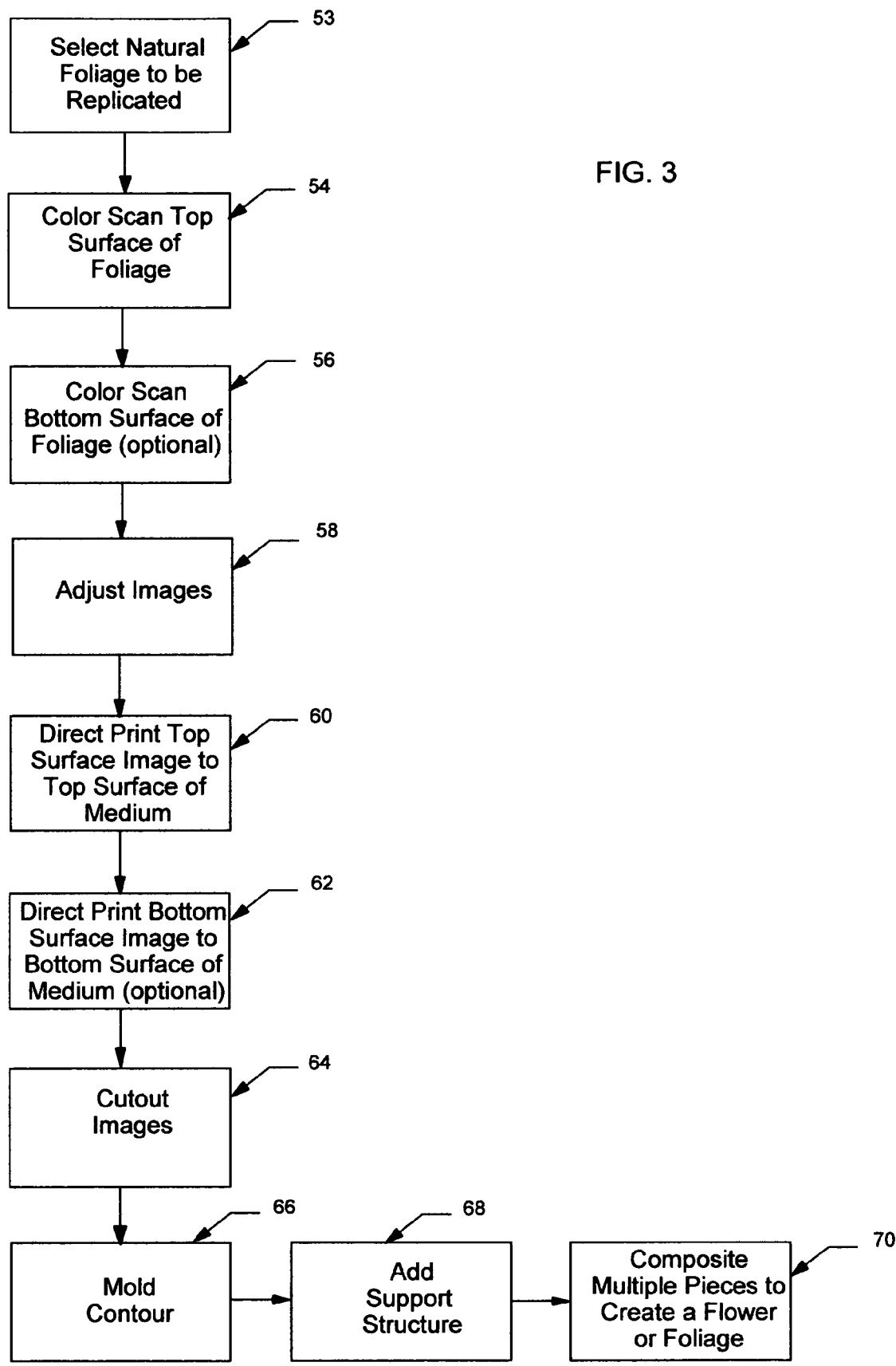
FIG. 3 is a flow chart of a process of the invention for making artificial foliage.

With reference to FIG. 3, a process of the invention for making artificial foliage begins by selecting natural foliage as shown in step 53 and digitally scanning the top and bottom surfaces of one or more pieces of the foliage using a color scanning process, as shown in steps 54 and 56.

The process continues in step 58 where the top surface and bottom surface image scans of each piece of the foliage are adjusted, using well-known image manipulation computer software programs, to permit accurate registration of the respective images on the top and bottom surfaces of a medium and to modify the size, shape, color balance, tone and orientation of the images. The scanned images are then transferred to a medium by directly printing the respective top surface and bottom surface images on respective top and bottom surfaces of the medium using image printing apparatus, such as a flat-bed digital printer, as shown in steps 60 and 62.

The medium may be made of organic or non-organic material such as natural fabric, synthetic fabric, paper, plastic, wood, metal, ceramic, glass and the like.

The transferred images are then cut out of the medium as shown in step 64. A computer-regulated laser cutting machine, well known in the art, may be used for accuracy.

In order to provide a natural contour for each piece of a petal or foliage, the process continues, as shown in step 66, by creating a mold reflecting the actual shape of the petal or foliage and heat pressing the cut material in the mold.

Wire or vein elements are added in step 68 to support the petals or foliage and add detail and the individual pieces are composited in step 70 to create a flower or foliage.

As shown in FIG. 3, the top and bottom surfaces of foliage are scanned and printed but it is understood that only one surface of the foliage, such as the top surface, may be used without detracting from the spirit of the invention.

Although the various features of novelty that characterize the process of the invention have been described in terms of certain preferred embodiments, other embodiments will become apparent to those of ordinary skill in the art, in view of the disclosure herein. Accordingly, the present invention is not limited by the recitation of the preferred embodiments, but is instead intended to be defined solely by reference to the appended claims.

What is claimed is:

1. A process for manufacturing artificial foliage, said process comprising: electronically scanning a natural flower petal and foliage to produce a two-dimensional color digital image thereof, said image having expanded color variations and composition details representative of the natural flower petal and foliage not obtainable with a silkscreen or heat transfer process, directly printing the two-dimensional image on a medium using image printing apparatus and cutting and forming the printed image to produce a realistic three-dimensional representation of the natural flower petal and foliage.

2. A process as in claim 1 wherein said image printing apparatus is a flat-bed digital printer.

3. A process as in claim 1 wherein said medium is comprised of organic material.

4. A process as in claim 1 wherein said medium is comprised of non-organic material.

5. A process as in claim 1 wherein said medium is selected from the group consisting of natural fabric, synthetic fabric, paper, plastic, wood, metal, ceramic and glass.

6. A process for manufacturing artificial flowers and foliage said process comprising: selecting one or more pieces of a natural flower and foliage; electronically scanning the top and bottom surfaces of the pieces to produce a two-dimensional color digital image thereof; said image having expanded color variations and composition details representative of the natural flower and foliage not obtainable with a silkscreen or heat transfer process, adjusting the top surface and bottom surface image scans using image manipulation software to modify the size, shape, color balance, tone and orientation of the image scans to permit accurate registration and color rendering thereof on respective top and bottom surfaces of a medium; transferring the adjusted image scans to the medium by directly printing respective top surface and bottom surface images on respective top and bottom surfaces of the medium using a two-dimensional image printing apparatus; cutting out transferred image pieces from the medium using laser cutting means to provide clean image edges; forming said cut pieces to produce a three-dimensional representation of the natural flower and foliage contour and adding support structure to individual cut pieces to permit securing of the pieces to a composited three-dimensional floral arrangement thereby producing a realistic floral arrangement representative of the natural flower and foliage.

7. A process as in claim 6 wherein said medium is comprised of organic material.

8. A process as in claim 6 wherein said medium is comprised of non-organic material.

9. A process as in claim 6 wherein said medium is selected from the group consisting of natural fabric, synthetic fabric, paper, plastic, wood, metal, ceramic and glass.

10. A process as in claim 6 wherein said image printing apparatus is a flat-bed digital printer.

* * * * *